US 12,452,496 B2

United States Patent
Xu

(10) Patent No.: US 12,452,496 B2
(45) Date of Patent: Oct. 21, 2025

(54) DEMONSTRATION METHOD AND DEVICE OF LIVE ROOM, COMPUTER DEVICE AND STORAGE MEDIUM

(71) Applicant: Beijing Zitiao Network Technology Co., Ltd., Beijing (CN)

(72) Inventor: Ciqiong Xu, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 33 days.

(21) Appl. No.: 18/515,424

(22) Filed: Nov. 21, 2023

(65) Prior Publication Data

US 2024/0171825 A1     May 23, 2024

(30) Foreign Application Priority Data

Nov. 21, 2022    (CN) .......................... 202211457902.9

(51) Int. Cl.
*G06F 16/70*       (2019.01)
*G06F 16/738*      (2019.01)
(Continued)

(52) U.S. Cl.
CPC ....... *H04N 21/4828* (2013.01); *G06F 16/738* (2019.01); *H04N 21/2187* (2013.01)

(58) Field of Classification Search
CPC ............. H04N 21/2187; H04N 21/431; H04N 21/472; H04N 21/4828; G06F 16/738
See application file for complete search history.

(56) References Cited

U.S. PATENT DOCUMENTS

| 9,177,225 | B1 * | 11/2015 | Cordova-Diba | .......... G06T 7/12 |
| 2010/0180217 | A1 * | 7/2010 | Li | ....................... G06F 16/9535 |
| | | | | 707/769 |

(Continued)

FOREIGN PATENT DOCUMENTS

| CN | 111400584 A | 7/2020 | |
| CN | 111970523 A | * 11/2020 | ......... G06F 16/9535 |

(Continued)

OTHER PUBLICATIONS

Machine Translation of CN 114647801A issued to Zhang, Published on Jun. 22, 2022 (Year: 2022).*

(Continued)

*Primary Examiner* — Mahesh H Dwivedi

(57) ABSTRACT

The present disclosure provides a demonstration method and device of a live room, a computer device and a storage medium, wherein, the method comprises: receiving a search word in a search box of an interface; obtaining the recommendation prompt information corresponding to a target live room and the critical object information of at least one target object demonstrated in the target live room; wherein at least one attribute feature of the target live room is matched with the search word; demonstrating the recommendation prompt information and the critical object information in an area of the interface except for the search box; and jumping to a target page corresponding to the target information in the target live room in response to a trigger operation of the target information; wherein the target information comprises: the recommendation prompt information or the critical object information.

17 Claims, 5 Drawing Sheets

(51) Int. Cl.
  *H04N 21/2187* (2011.01)
  *H04N 21/482* (2011.01)

(56) References Cited

U.S. PATENT DOCUMENTS

| | | | |
|---|---|---|---|
| 2021/0314639 A1* | 10/2021 | Li | H04N 21/26603 |
| 2022/0239988 A1* | 7/2022 | Yang | H04N 21/4725 |
| 2023/0385328 A1 | 11/2023 | Wu et al. | |
| 2023/0385330 A1 | 11/2023 | Zhu | |
| 2023/0401634 A1* | 12/2023 | Wang | G06Q 30/0253 |
| 2024/0040201 A1* | 2/2024 | Lee | G06F 3/0482 |
| 2024/0171822 A1* | 5/2024 | Qiu | H04N 21/8586 |
| 2025/0056099 A1 | 2/2025 | Lan | |

FOREIGN PATENT DOCUMENTS

| | | | | |
|---|---|---|---|---|
| CN | 112148977 A | * | 12/2020 | G06F 16/9535 |
| CN | 113378058 A | | 9/2021 | |
| CN | 113469779 A | * | 10/2021 | |
| CN | 114647801 A | * | 6/2022 | |
| CN | 114928750 A | | 8/2022 | |
| WO | 2022/237410 A1 | | 11/2022 | |

OTHER PUBLICATIONS

Machine Translation of CN 111970523 A issued to Xiong, Published on Nov. 20, 2020 (Year: 2020).*
Office action received from Chinese patent application No. 202211457902.9 mailed on Mar. 28, 2025, 20 pages (10 pages English Translation and 10 pages Original Copy).

\* cited by examiner

DEMONSTRATION METHOD AND DEVICE OF LIVE ROOM, COMPUTER DEVICE AND STORAGE MEDIUM

CROSS-REFERENCE TO RELATED APPLICATIONS

The present application is based on and claims priority to China Patent Application No. 202211457902.9 filed on Nov. 21, 2022, the disclosure of which is incorporated by reference herein in its entirety.

TECHNICAL FIELD

The present disclosure relates to the field of live-streaming application technology, in particular to a demonstration method and device of a live room, a computer device and a storage medium.

BACKGROUND

With the boom of the live-streaming application technology, more sellers or anchors begin to interact with other users by way of live rooms, for example, selling products by way of live rooms. Specifically, when a user is intended to view a live-streaming, it is possible to search for a corresponding live room by a keyword on the search page. However, in the related searching art of a live room, the user needs to enter a corresponding live room before learning about the live-streaming content of the live room. Therefore, the user needs to search for multiple times to find the live-streaming content intended to be viewed; for example, the user needs to repeatedly perform the operations of searching a live room, entering a live room and exiting a live room; this search solution leads to cumbersome search operations for the user, thereby reducing the searching efficiency of a live room by the user and further affecting the viewing experience of the user.

SUMMARY

The embodiments of the present disclosure at least provide a demonstration method and device of a live room, a computer device and a storage medium.

In a first aspect of the embodiments of the present disclosure, a demonstration method of a live room is provided, the method comprising: receiving a search word in a search box of an interface; obtaining the recommendation prompt information corresponding to a target live room and the critical object information of at least one target object demonstrated in the target live room; wherein at least one attribute feature of the target live room is matched with the search word; demonstrating the recommendation prompt information and the critical object information in an area of the interface except for the search box; and jumping to a target page corresponding to the target information in the target live room in response to a trigger operation of the target information; wherein the target information comprises: the recommendation prompt information or the critical object information.

In an optional embodiment, the method further comprises: determining a live room feature of the target live room; wherein the live room feature is associated with a type of the target live room; determining an object screening parameter matched with the live room feature from at least one screening dimension; wherein the screening dimension comprises at least one of the following: a live room dimension, an interactive data dimension of a demonstration object in the live room, or an object attribute dimension of a demonstration object in the live room; and determining a demonstration object matched with the object screening parameter as a target object among a plurality of demonstration objects in the target live room.

In an optional embodiment, the method further comprises: determining a trigger probability of each of the demonstration objects in the target live room, wherein the trigger probability is determined based on the object association between a historical trigger object and each demonstration object, and the historical trigger object is a demonstration object of the trigger operation performed by the user in the live room at a historical moment; and determining the demonstration object that satisfies a trigger requirement as a target object among the demonstration objects based on the trigger probability.

In an optional embodiment, the method further comprises: determining at least one associated demonstration object of the target object among a plurality of demonstration objects in the target live room, wherein each of the associated demonstration objects and the target object contains an associated object attribute; and determining the critical object information based on a keyword of each of the target objects and a keyword of the associated demonstration object.

In an optional embodiment, the demonstrating the critical object information in an area of the interface except for the search box comprises: demonstrating a plurality of first keywords in an area of the interface except for the search box; wherein the plurality of first keywords comprise a keyword of each of the target objects and a keyword of each of the associated demonstration objects; or splicing a keyword of each of the target objects and a keyword of each of the associated demonstration objects to obtain a second keyword, and demonstrating the second keyword in an area of the interface except for the search box.

In an optional embodiment, the jumping to a target page corresponding to the target information in the target live room in response to a trigger operation of the target information comprises: obtaining the object information of the target object and the object information of the associated demonstration object in response to a trigger operation of the first keyword or the second keyword, wherein the object information comprises: link information and a live-streaming segment, wherein the link information is a link for jumping to a corresponding object detail page; and jumping to a demonstration object information page, and demonstrating the object information of the target object and the object information of the associated demonstration object in the object information page.

In an optional embodiment, the method further comprises: obtaining the live room attribute information of candidate live rooms; wherein the live room attribute information comprises at least one of the following: a live room name, the identification information of the live room, the attribute information of an anchor corresponding to the live room, an object type of a demonstration object in the live room, or a live-streaming state of the live room; and determining a candidate live room with the live room attribute information matched with the search word, and determining the target live room based on the matched candidate live room.

In an optional embodiment, the demonstrating the recommendation prompt information and the critical object information in an area of the interface except for the search box comprises: demonstrating the recommendation prompt information in a first area of the interface; wherein the recommendation prompt information comprises at least one of the following: a recommendation prompt word associated with the search word, an image identification of the target live room or the viewer information of the target live room; wherein the first area is a lower area of the search box; and demonstrating the critical object information in the second area of the interface; wherein the second area is an area adjacent to the first area in the lower area of the search box, and the critical object information is used to indicate the difference information of the target object relative to other demonstration objects in the target live room, and/or a current demonstration state of the target object.

In an optional embodiment, the method further comprises: determining the target name information matched with that search word in the preset name information; wherein the name information comprises at least one of the following: a live room name of the target live room, an anchor name of an anchor corresponding to the target live room, or an object name of a demonstration object; and splicing the target name information and the preset live-streaming information to obtain the recommendation prompt word.

In an optional embodiment, the critical object information comprises at least one of the following: a narration state of the target object, an object type of the target object, the brand information to which the target object belongs, or an object name of the target object.

In a second aspect of the embodiments of the present disclosure, a demonstration device for a live room is further provided, the device comprising: a receiving unit for receiving a search word in a search box of an interface; an obtaining unit configured to obtain the recommendation prompt information corresponding to a target live room and the critical object information of at least one target object demonstrated in the target live room; wherein at least one attribute feature of the target live room is matched with the search word; a demonstrating unit configured to demonstrate the recommendation prompt information and the critical object information in an area of the interface except for the search box; and a jumping unit configured to jump to a target page corresponding to the target information in the target live room in response to a trigger operation of the target information; wherein the target information comprises: the recommendation prompt information or the critical object information.

In a third aspect of the embodiments of the present disclosure, a computer device is further provided, the computer device comprising a processor, a memory and a bus, wherein the memory has processor-executable, machine-readable instructions stored thereon, the processor and the memory are communicated via the bus during operation of the computer device, and the machine-readable instructions, when executed by the processor, perform the steps of the above-described first aspect or any possible embodiment of the first aspect.

In a fourth aspect of the embodiments of the present disclosure, a computer-readable storage medium is further provided, the computer-readable storage medium having a computer program stored thereon that, when executed by a processor, performs the steps of the above-described first aspect or any possible embodiment of the first aspect.

In the embodiments of the present disclosure, first, receiving a search word in a search box of the interface; then, determining a target live room matched with the search word, obtaining the recommendation prompt information corresponding to the target live room, and obtaining the critical object information of at least one target object demonstrated in the target live room based on the attribute feature of the live room; next, it is possible to demonstrate the recommendation prompt information and the critical object information in an area of the interface except for the search box. After a trigger operation of the recommendation prompt information or the critical object information is detected, it is possible to jump to a target page corresponding to the recommendation prompt information or the critical object information in the target live room.

By way of the above-described processing method, it is possible to demonstrate the critical object information of the target demonstration object in the live room for the user when the user searches for a corresponding live room, so that the user may determine a target object demonstrated in the live room before entering the live room. Compared with an existing method in which it is necessary to search for a live room and enter a live room repeatedly, this processing method may simplify the search operation of a live room by the user, improve the search efficiency of a live room by the user, and further improve the viewing experience of a live room by the user.

In order to make the above-described objects, features and advantages of the present disclosure more evident and comprehensible, a detailed description will be made below by way of preferred embodiments and in conjunction with the accompanying drawings.

BRIEF DESCRIPTION OF THE ACCOMPANYING DRAWINGS

In order to explain the technical solution according to the embodiments of the present disclosure more explicitly, the accompanying drawings required to be used in the embodiments will be briefly introduced below, and the accompanying drawings here are incorporated into and constitute a part of this specification; these accompanying drawings show the embodiments conforming to the present disclosure and serve to explain the technical solution of the present disclosure together with the specification. It should be understood that, the following accompanying drawings which only show some embodiments of the present disclosure, should not be regarded as defining the scope; for those of ordinary skill in the relevant art, other related accompanying drawings may also be obtained according to these accompanying drawings on the premise that no inventive effort is involved.

DETAILED DESCRIPTION

Figure 1:
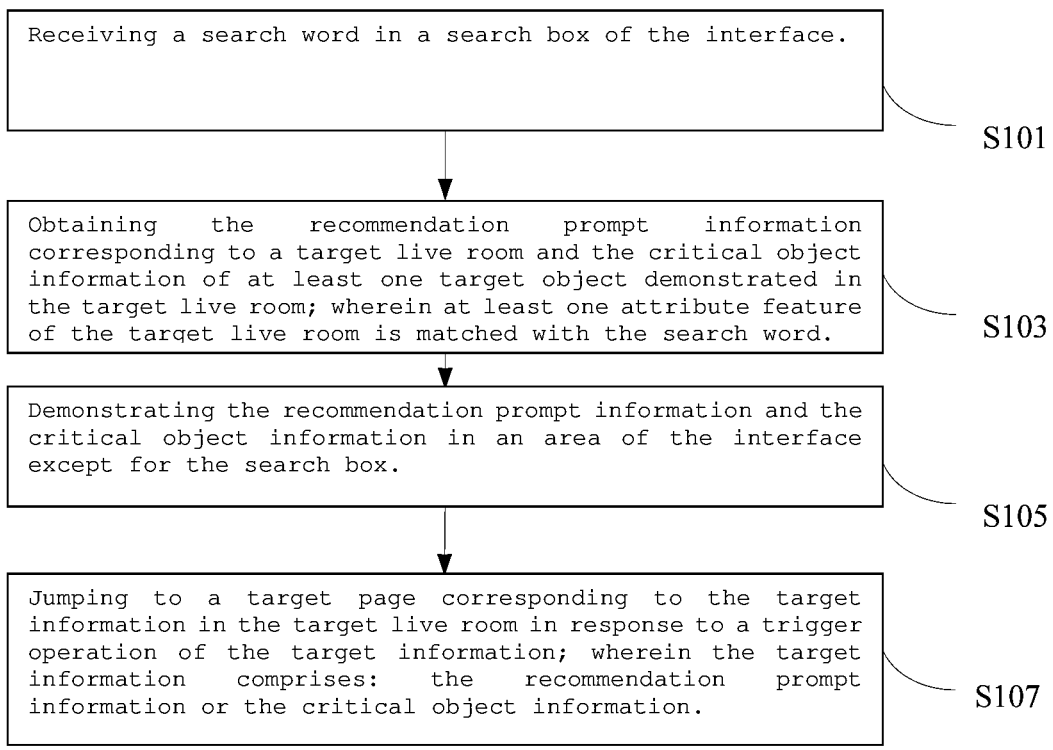
FIG. 1 shows a flowchart of a demonstration method of a live room provided by an embodiment of the present disclosure.

In order to make the objects, technical solutions and advantages of the embodiments of the present disclosure more explicit, the technical solution in the embodiments of the present disclosure will be explicitly and fully described in conjunction with the accompanying drawings in the embodiments of the present disclosure; apparently, the embodiments described are only some embodiments of the present disclosure, rather than all of the embodiments. The components of the embodiments of the present disclosure generally depicted and illustrated in the accompanying drawings here may be arranged and designed in various different configurations. Therefore, the following detailed description of the embodiments of the present disclosure provided in the accompanying drawings is not intended to limit the scope of the claimed disclosure, but only represents selected embodiments of the present disclosure. Based on the embodiments of the present disclosure, all the other embodiments obtained by those skilled in the art on the premise that no inventive effort is involved pertain to the protection scope of the present disclosure.

With the boom of the live-streaming application technology, more sellers or anchors begin to interact with other users by way of live rooms, for example, selling products by way of live rooms. Specifically, when a user is intended to view a live-streaming, it is possible to search for a corresponding live room by a keyword on the search page. However, in the related searching art of a live room, the user needs to enter a corresponding live room before learning about the live-streaming content of the live room. Therefore, the user needs to search for multiple times to find the live-streaming content intended to be viewed; for example, the user needs to repeatedly perform the operations of searching a live room, entering a live room and exiting a live room; this search solution leads to cumbersome search operations for the user, thereby reducing the searching efficiency of a live room by the user and further affecting the viewing experience of the user.

Based on the above-described research, the present disclosure provides a demonstration method and device of a live room, a computer device and a storage medium. In the embodiments of the present disclosure, first, receiving a search word in a search box of the interface; then, determining a target live room matched with the search word, obtaining the recommendation prompt information corresponding to the target live room, and obtaining the critical object information of at least one target object demonstrated in the target live room based on the attribute feature of the live room; next, it is possible to demonstrate the recommendation prompt information and the critical object information in an area of the interface except for the search box. After a trigger operation of the recommendation prompt information or the critical object information is detected, it is possible to jump to a target page corresponding to the recommendation prompt information or the critical object information in the target live room.

By way of the above-described processing method, it is possible to demonstrate the critical object information of the target demonstration object in the live room for the user when the user searches for a corresponding live room, so that the user may determine a target object demonstrated in the live room before entering the live room. Compared with an existing method in which it is necessary to search for a live room and enter a live room repeatedly, this processing method may simplify the search operations of a live room by the user, improve the search efficiency of a live room by the user, and further improve the viewing experience of a live room by the user.

It should be noted that: similar symbols and letters indicate similar items in the following accompanying drawings, so that once an item is defined in one accompanying drawing, there is no need to further define and explain the same in subsequent accompanying drawings.

The term "and/or" herein only describes an associative relation, which means that there may be three relations, for example, A and/or B, which may mean three cases: A alone, A and B at the same time, and B alone. In addition, the term "at least one" herein means any one or any combination of at least two of a plurality, for example, comprising at least one of A, B or C, which may mean comprising any one or more elements selected from a set of A, B or C.

It may be understood that, before using the technical solutions disclosed in various embodiments of this disclosure, the user should be informed of the type, operation range, operation scenario and the like of personal information involved in this disclosure in an appropriate way according to relevant laws and regulations, and authorization should be obtained from the user.

For example, in response to receiving an active request from the user, prompt information is sent to the user to specifically prompt the user that personal information of the user will be required to be obtained and used in the operation requested to be performed. Therefore, the user may independently choose whether to provide personal information to software or hardware such as a computer device, an application program, a server or a storage medium that performs the operations of the technical solution of the present disclosure according to the prompt information.

As one alternative but non-defining implementation, in response to receiving an active request from the user, a method of sending the prompt information to the user may be, for example, in the form of a pop-up window, in which the prompt information may be presented in text. In addition, the pop-up window may also carry a selection control for the user to choose "agree" or "disagree" to provide personal information to the computer device.

It may be understood that, the above-described process of informing the user and obtaining authorization from the user is only schematic, but does not define the constitution of the implementation of this disclosure, and other methods that conform to relevant laws and regulations may also be applied to the implementation of this disclosure.

In order to facilitate understanding this embodiment, first, the demonstration method of a live room disclosed in the embodiment of this disclosure will be introduced in detail; the performing subject of the demonstration method of a live room provided in the embodiment of this disclosure is generally a computer device with certain computing power comprising, for example, a terminal device or a server or other processing devices, wherein the terminal device may be a user equipment (UE), a mobile device, a user terminal, a terminal, a cellular phone, a cordless phone, Personal Digital Assistant (PDA), a handheld device, a computing device, a vehicle-mounted device, a wearable device or the like. In some possible implementations, the demonstration method of a live room may be realized by the processor calling computer-readable instructions stored in the memory.

Embodiment 1

Referring to FIG. 1, it is a flowchart of a method of a live room provided by an embodiment of the present disclosure, the method comprising steps S101~S107, wherein:

S101: receiving a search word in a search box of the interface.

Figure 2:
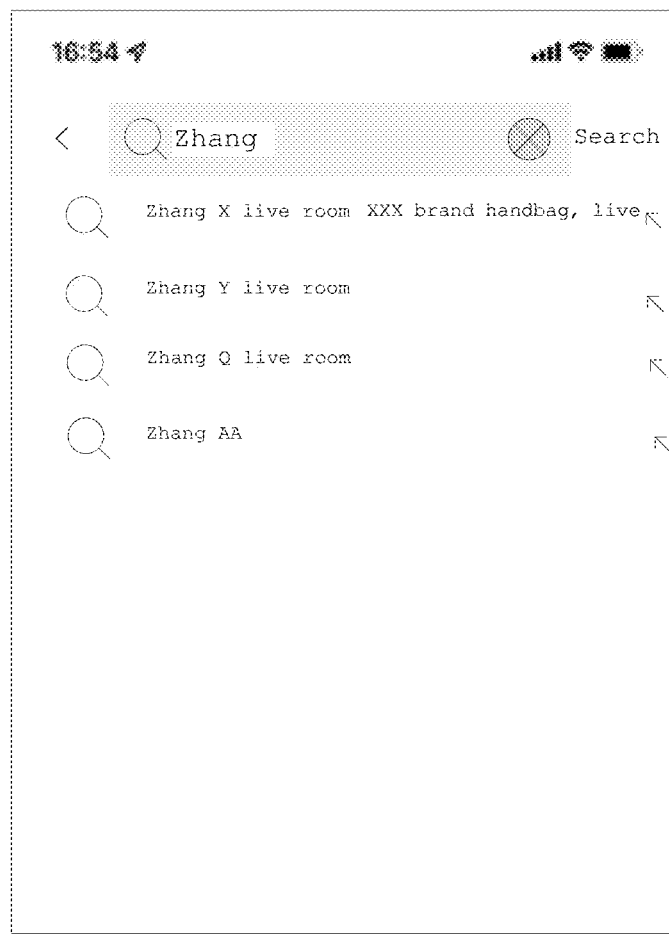
FIG. 2 shows a schematic effect view of a search box interface provided by an embodiment of the present disclosure.

Here, the user may enter a search word in a search box of an interface as shown in FIG. 2, for example, a search word "Zhang" may be entered. After an entering operation of the user in the search box is detected, a search word may be received in a search box of the interface.

S103: obtaining the recommendation prompt information corresponding to a target live room and the critical object information of at least one target object demonstrated in the target live room; wherein at least one attribute feature of the target live room is matched with the search word. After a search word is received, the target live room matched with the search word among all the live rooms may be determined. Wherein, the attribute feature of the live room may be matched with the search word, and the live room that satisfies a matching result may be determined as the target live room.

Here, at least one attribute feature of the target live room may comprise at least one of the following: basic attributes of the live room, or a type of an object with high demonstration frequency in the live room (for example, a live room selling books or a live room selling apples). Wherein, the basic attributes of the live room may comprise at least one of the following: a live room name, a name of the anchor in the live room, the ID of the live room, the type of the live room (for example, the anchor live room, the brand live room) or the brand of the live room.

After the target live room is determined, it is possible to obtain the recommendation prompt information corresponding to the target live room, and obtain the critical object information of at least one target object demonstrated in the target live room.

Here, the recommendation prompt information may comprise at least one of the following: a recommendation prompt word, the number of viewers of the target live room, or a user avatar of the target live room. Wherein, the recommendation prompt word is an prompt word determined based on a search word to indicate the recommended target live room. The target object may be products sold in the target live room, for example, the target object may be an object in the shopping list of the target live room, wherein the shopping list is a functional module to display corresponding products for the target live room. The critical object information of the target object comprises at least one of the following: an narration state of the target object, an object type of the target object, the brand information to which the target object belongs, or an object name of the target object. For example, if the target object is a backpack, the critical object information may be: XXX brand backpack.

In one possible implementation, the search word may be sent to the server. The server may determine a target live room matched with the search word among all the live rooms according to the search word. Then, the server may determine the recommendation prompt information matched with the target live room, determine the critical object information of at least one target object demonstrated in the target live room, and feedback the recommendation prompt information and the critical object information to the client.

S105: demonstrating the recommendation prompt information and the critical object information in an area of the interface except for the search box.

Figure 3:
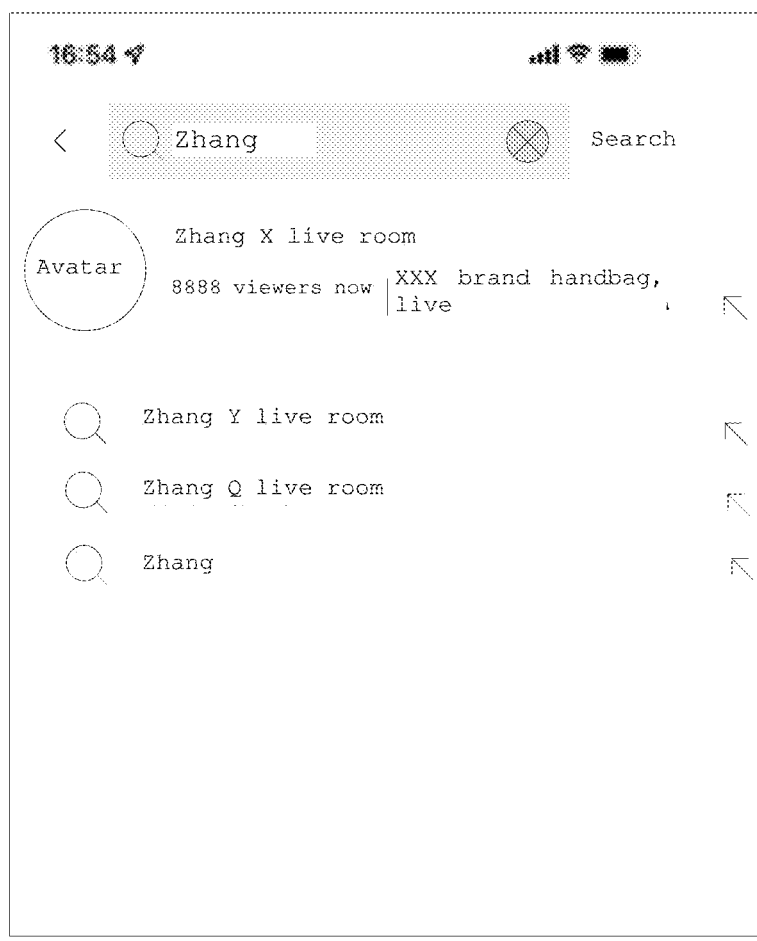
FIG. 3 shows a schematic effect view of another search box interface provided by an embodiment of the present disclosure.

For example, as shown in FIGS. 2 and 3, the recommendation prompt information and the critical object information may be demonstrated in other areas than the search box in this interface.

S107: jumping to a target page corresponding to the target information in the target live room in response to a trigger operation of the target information; wherein the target information comprises: the recommendation prompt information or the critical object information.

In the embodiments of the present disclosure, it is possible to detect a trigger operation of the user on the recommendation prompt information or the critical object information, and jump to a corresponding target page in the target live room.

For example, if a trigger operation of the recommendation prompt information is detected, it is possible to jump to a live page of the target live room (i.e., the above-described target page).

Figure 4:
FIG. 4 shows a schematic effect view of an intermediate page provided by an embodiment of the present disclosure.

In one possible embodiment, if a trigger operation of the recommendation prompt information is detected, it is possible to first jump to an intermediate page shown in FIG. 4, wherein the intermediate page comprises a live preview screen, the recommendation prompt information and an demonstration object in the live room (i.e., a product in the live-streaming in FIG. 4). Then, jump to a live page demonstrating the target live room if a trigger operation of the live preview screen is detected.

In another possible embodiment, if a trigger operation of the recommendation prompt information is detected, it is possible to directly jump to a live-streaming page showing the target live room.

If a trigger operation of the critical object information is detected, it is possible to jump to an object information page of the target object (that is, the above-described target page), wherein the object information page comprises the object profile information of the target object; wherein the object profile information may be text type information, audio or video type information, or image type information.

In the embodiments of the present disclosure, first, receiving a search word in a search box of the interface; then, determining a target live room matched with the search word, obtaining the recommendation prompt information corresponding to the target live room, and obtaining the critical object information of at least one target object demonstrated in the target live room based on the attribute feature of the live room; next, it is possible to demonstrate the recommendation prompt information and the critical object information in an area of the interface except for the search box. After a trigger operation of the recommendation prompt information or the critical object information is detected, it is possible to jump to a target page corresponding to the recommendation prompt information or the critical object information in the target live room.

By way of the above-described processing method, it is possible to demonstrate the critical object information of a target object demonstrated in the live room for the user when the user searches for a corresponding live room, so that the user may determine a target object demonstrated in the live room before entering the live room. Compared with an existing method in which it is necessary to search for a live room and enter a live room repeatedly, this processing method may simplify the search operations of a live room by the user, improve the search efficiency of a live room by the user, and further improve the viewing experience of a live room by the user.

As may be known from the above-described description, in the embodiments of the present disclosure, after receiving a search word, it is possible to determine a target live room, and determine the recommendation prompt information corresponding to the target live room; then, it is possible to determine at least one target object demonstrated in the target live room, and determine the critical object information of the target object.

In one alternative embodiment, on the basis of the embodiment shown in FIG. 1, the target object may also be determined by the method described below, which specifically comprises the following steps:

Step S11: determining the live room feature of the target live room; wherein the live room feature is associated with a type of the target live room;

Step S12: determining an object screening parameter matched with the live room feature from at least one screening dimension; wherein the screening dimension comprises at least one of the following: a live room dimension, an interactive data dimension of a demonstration object in the live room, or an object attribute dimension of a demonstration object in the live room;

Step S13: determining the demonstration object matched with the object screening parameter as a target object among a plurality of demonstration objects in the target live room.

In the embodiments of the present disclosure, first, the live room feature of the target live room is determined, wherein the live room feature comprise at least one of the following: an anchor live room, an official live room of a brand, the basic attribute features of the anchor in the live room, and the type of a product sold in the live room (for example, women's clothing live room and men's clothing live room). Then, the object screening parameter matched with the live room feature may be determined from at least one screening dimension.

Here, the screening parameter pertaining to the dimension of the live room is used to indicate a demonstration mode of the demonstration object in the live room; for example, the demonstration object is the object announced in advance before live-streaming; for another example, the demonstration object is a new demonstration object or a promotion demonstration object in the live room. The screening parameter pertaining to the interactive data dimension comprises at least one of the following: browse, purchase, collection, or other parameters. The screening parameter pertaining to the object attribute dimension is used to indicate the object attribute information of the demonstration object.

In a specific implementation, first, a screening dimension matched with the live room feature is determined in at least one screening dimension. Here, a mapping relation between the screening dimension and the live room feature may be provided in advance, so that the screening dimension matched with the live room feature is determined based on this mapping relation. Then, the object screening parameter may be determined from the matched screening dimension. At least one sub-screening parameter may be determined for each screening dimension; then, the sub-screening parameter determined from all the matched screening dimensions may be determined as the above-described object screening parameter.

For example, for the anchor live room, it is possible to determine the following object screening parameter from the live room dimension, the interactive data dimension and the object attribute dimension: object screening parameters such as recommendation campaign before live-streaming, highest purchase amount or highest promotion degree.

Next, the target object may be determined from a plurality of demonstration objects in the target live room according to the above-described object screening parameter. For example, it is possible to screen out the product matched with the object screening parameter from the products in a shopping list in the target live room as a target object.

In the above-described embodiment, the target object with a high fit with the live room may be screened by a method of determining the object screening parameter by the live room feature so as to screen the target object out from a plurality of demonstration objects according to the object screening parameter. By demonstrating the critical object information of the target object for the user, it is possible to demonstrate the live room feature of the target live room for the user, thereby further improving the search efficiency of a live room by the user.

In one alternative embodiment, on the basis of the embodiment shown in FIG. 1, the target object may also be determined by the method described below, which specifically comprises the following steps:

Step S21: determining the trigger probability of each of the demonstration objects in the target live room, wherein the trigger probability is determined based on the object association between a historical trigger object and each demonstration object, and the historical trigger object is a demonstration object of the trigger operation performed by the user in the live room at a historical moment;

Step S22: determining the demonstration object that satisfies the trigger requirement among the demonstration objects as a target object based on the trigger probability.

In the embodiments of the present disclosure, it is possible to obtain the demonstration object of the trigger operation performed by the user in the target live room or other live rooms at a historical moment, so as to obtain a historical trigger object, wherein the trigger operation may comprise at least one of the following: trigger operations such as click, purchase, collection, or forwarding.

After the historical trigger object is determined, it is possible to determine the object association between a historical trigger object and each demonstration object. Here, it is possible to calculate the similarity between the object attribute information of a historical trigger object and the object attribute information of each demonstration object, so as to determine the object association based on the similarity.

Next, the object association may be determined as the trigger probability of the demonstration object. Wherein, the probability meaning of the trigger probability may be determined by the operation type of the trigger operation performed on a historical trigger object. For example, if the trigger operation is a click operation, the trigger probability may be understood as a click probability; for another example, if a trigger operation is a purchase operation, the trigger probability may be understood as a purchase probability.

If a plurality of trigger probabilities may be determined for each demonstration object, a final trigger probability of the demonstration object may be obtained by weighted summation of a plurality of trigger probabilities. For example, if a click probability and a purchase probability may be determined for the demonstration object, weighted summation may be performed on the click probability and the purchase probability based on the weights assigned to the click operation and the purchase operation in advance, so as to obtain a final trigger probability of the demonstration object.

After the trigger probability of each demonstration object is obtained, the demonstration object that satisfies the trigger requirement may be screened as a target object from a plurality of demonstration objects. For example, the demonstration object with a trigger probability greater than or equal to a preset probability threshold among a plurality of demonstration objects may be determined as a target object.

In the above-described embodiment, after the target live room matched with the search word is determined, the target object that conforms to a trigger intension of the user may also be screened out from the target live room, thereby further improving the search efficiency of a live room by the user.

After at least one target object is determined according to the method described above, the critical object information of the target object may be determined.

The products sold in the live room usually comprise a product portfolio, that is, the products with the same type or a high association are bundled in demonstration. In this case, on the basis of the embodiment shown in FIG. 1, the critical object information of the target object may further be determined by the method described below, which specifically comprises the following steps:

Step S31: determining at least one associated demonstration object of the target object among a plurality of demonstration objects in the target live room, wherein each of the associated demonstration objects and the target object contain an associated object attribute therebetween;

Step S32: determining the critical object information based on the keyword of each of the target objects and the keyword of the associated demonstration object.

In the embodiments of the present disclosure, a plurality of demonstration objects in the target live room might contain an associated demonstration object of the target object; for example, the associated demonstration object may be understood as a product introduced in association with the target object. For example, if the target object is "original flavor lotus root starch", the associated demonstration object may be an object such as "lotus root starch mate".

In one alternative embodiment, the associated demonstration object of the target object may be determined from a plurality of demonstration objects according to a preset object association relation.

In another alternative embodiment, it is possible to calculate the object association between the demonstration object and the target object, and determine the demonstration object with the object association greater than or equal to a preset association threshold as the associated demonstration object.

After the associated demonstration object of the target object is determined, it is possible to determine the keyword of the target object and the keyword of the associated demonstration object, so as to determine the critical object information based on the keyword of the target object and the keyword of the associated demonstration object.

Here, the keyword of the target object and the keyword of the associated demonstration object may be determined as the critical object information of the above-described objects respectively. Alternatively, the keyword of the target object and the keyword of the associated demonstration object is spliced to obtain a keyword, and the spliced keyword is determined as the critical object information.

On this basis, the above-described step S105 demonstrates the critical object information in an area of the interface except for the search box, which specifically comprises the following methods:

Method 1:

A plurality of first keywords are demonstrated in an area of the interface except for the search box; wherein the plurality of first keywords comprise a keyword of each of the target objects and a keyword of each of the associated demonstration objects;

In the embodiments of the present disclosure, it is possible to demonstrate the keyword of the target object and the keyword of the associated demonstration object as the critical object information respectively. At this time, a plurality of first keywords may be determined based on a combination of the keyword of the target object and the keyword of the associated demonstration object, and then each first keyword may be demonstrated sequentially.

Method 2:

A keyword of each of the target objects and a keyword of each of the associated demonstration objects are spliced to obtain a second keyword, and the second keyword is demonstrated in an area of the interface except for the search box.

In the embodiments of the present disclosure, a keyword of the target object and a keyword of each of the associated demonstration objects may be spliced to obtain a second keyword.

Here, a keyword splicing sequence may be determined based on the object association between the associated demonstration object and the target object. For example, the keyword of the target object may be taken as a prefix position of the second keyword; then, the keywords of the associated demonstration object may be spliced behind the keyword of the target object in a descending sequence of the object association, so as to obtain a second keyword, wherein the second keyword may be understood as one keyword.

On this basis, the above-described step S107 jumps to a target page corresponding to the target information in the target live room in response to a trigger operation of the target information, which specifically comprises the following steps:

Step S1071: obtaining the object information of the target object and the object information of the associated demonstration object in response to a trigger operation of the first keyword or the second keyword, wherein the object information comprises: link information and a live-streaming segment, wherein the link information is a link for jumping to a corresponding object detail page;

Step S1072: jumping to a demonstration object information page, and demonstrating the object information of the target object and the object information of the associated demonstration object in the object information page.

In the embodiments of the present disclosure, after the first keyword or the second keyword is determined according to the method described above, the user may perform a trigger operation on the first keyword or the second keyword. After a trigger operation of the first keyword or the second keyword is detected, it is possible to obtain the object information of the target object and the object information associated with the demonstration object, and demonstrate the above-described object information on the object information page.

Here, the object information may comprise link information and a live-streaming segment, wherein the link information is a link for jumping to an object detail page of the corresponding object, and the object detail page may be a product purchase page. The live-streaming segment may be understood as a live-streaming narration segment of the target object and the associated demonstration object. Wherein, the live-streaming narration segment may contain a plurality of sub-segments, which may comprise: a narration segment of each target object, a narration segment of each associated demonstration object, and a joint narration segment of the target object and the associated demonstration object, wherein the joint narration segment is used to indicate the an associated object attribute between the target object and the associated demonstration object.

In the above-described embodiment, before the user enters the target live room, the target object matched with the live room feature of the target live room and the object information of its associated demonstration object may be demonstrated for the user. The user, if intended to buy the target object and its associated demonstration object, may enter the corresponding product purchase page by triggering the link information; if without purchase intent, may omit the operation of entering the target live room, thereby improving the search efficiency of a live room by the user.

In one alternative embodiment, the target live room may be determined by the following method, which specifically comprises the following steps:

Step S41: obtaining the live room attribute information of the candidate live room; wherein the live room attribute information comprises at least one of the following: a live room name, the identification information of the live room, the attribute information of an anchor corresponding to the live room, an object type of a demonstration object in the live room, or a live-streaming state of the live room;

Step S42: determining the candidate live room with the live room attribute information matched with the search word, and determining the target live room based on the matched candidate live room.

In the embodiments of the present disclosure, first, it is possible to determine the candidate live room, and then determine the live room attribute information of the candidate live room, for example, it is possible to determine the attribute information such as a live room name of the live room, the identification information of the live room, the attribute information of an anchor corresponding to the live room, an object type of a demonstration object in the live room or a live-streaming state of the live room.

Here, the identification information of the live room may be the ID information of the live room; the attribute information of an anchor corresponding to the live room may be information such as a name of the anchor, a type of the anchor (for example, a beauty anchor), or the fan count of the anchor; the object type of the demonstration object in the live room may be a category of the product demonstrated in the shopping list of the live room, for example, the category is backpack, fruit, or the like; the live-streaming state of the live room may be a live-streaming state or a non-live-streaming state.

In the embodiments of the present disclosure, the live room attribute information may be matched with the search word, so that the candidate live room matched with the search word may be determined among the candidate live rooms.

If it is determined that the live room attribute information contains information matched with the search word, the candidate live room corresponding to the live room attribute information is determined as a candidate live room matched with the search word.

For example, if the search word is "Zhangsan", the candidate live rooms containing "Zhangsan" in a live room name may be determined, and the candidate live room in a live-streaming state may be determined as the target live room among the candidate live rooms based on a live-streaming state. For another example, if the search word is "dress", the target live room with an object type "dress" of the demonstration object in the live room may be determined as the target live room.

In the above-described embodiment, it is possible to more accurately recommend a corresponding live room for the user by a method in which the live room attribute information is matched with the search word so that the target live room is determined among the candidate live rooms according to a matching result, thereby further shortening the search time of a live room by the user.

In one alternative embodiment, the above-described step S105 demonstrates the recommendation prompt information and the critical object information in an area of the interface except for the search box, which specifically comprises the following steps:

Step S51: demonstrating the recommendation prompt information in the first area of the interface; wherein the recommendation prompt information comprises at least one of the following: a recommendation prompt word associated with the search word, an image identification of the target live room or the viewer information of the target live room, wherein the first area is a lower area of the search box;

Step S52: demonstrating the critical object information in the second area of the interface; wherein the second area is an area adjacent to the first area in the lower area of the search box, and the critical object information is used to indicate the difference information of the target object relative to other demonstration objects in the target live room, and/or a current demonstration state of the target object.

In the embodiments of the present disclosure, the recommendation prompt information may be demonstrated in the first area located in the lower area of the search box. Then, the critical object information is demonstrated in the second area adjacent to the first area in the lower area of the search box. Wherein, the critical object information may be used to indicate the difference information of the target object relative to other demonstration objects in the target live room, for example, an object type of the target object, the brand information to which the target object belongs, an object name of the target object, etc. In addition, the critical object information may also be used to indicate a current demonstration state of the target object, for example, a narration state of the target object. For example, the target live room is narrating the target object, or the target live room has finished narrating the target object, or the target live room is about to narrate the target object.

As shown in FIG. 2, the recommendation prompt word "Zhang X Live Room" associated with the search word may be demonstrated in the first area, and the brand information "XXX brand" to which the target object belongs and the object type "handbag" of the target object may be demonstrated in the second area.

As shown in FIG. 3, the recommendation prompt word "Zhang X Live Room" associated with the search word, the image identification "avatar" of the target live room and the viewer information "8888 viewers now" of the target live room may be demonstrated in the first area, and the brand information "XXX brand" to which the target object belongs and the object type "handbag" of the target object may be demonstrated in the second area.

In one alternative embodiment, the recommendation prompt word in the associative information may be recommended in the following method, which specifically comprises the following steps:

First, determining the target name information matched with the search word in the preset name information; wherein the name information comprises at least one of the following: a live room name of the target live room, an anchor name of an anchor corresponding to the target live room, or an object name of a demonstration object;

Then, splicing the target name information and the preset live-streaming information to obtain the recommendation prompt word.

In the embodiments of the present disclosure, the target name information containing the search word may be determined in a live room name, an anchor name and an object name. For example, if the search word is "Oriental", the live room name "Oriental Selection" contains the search word, so that the live room name is determined as the target name information.

In the embodiments of the present disclosure, it is also possible to determine a name containing a word with the same type as the search word among a live room name, an anchor name and an object name, and determine the name as the target name information. For example, if the search word is "apple", the live room name "XX fruit farmer" contains a word "fruit farmer" with the same type as "apple", so that the target name information may be "XX fruit farmer".

After the target name information is determined, the target name information and the preset live-streaming information may be spliced to obtain the recommendation prompt word. Wherein, the preset live-streaming information may be "live room". For example, if the target name information is "XX fruit farmer" and the preset live-streaming information is "live room", the recommendation word may be "XX fruit farmer live room".

By way of the above-described processing method, it is possible to demonstrate the critical object information of the target demonstration object in the live room for the user when the user searches for a corresponding live room, so that the user may determine a target object demonstrated in the live room before entering the live room. Compared with an existing method in which it is necessary to search for a live room and enter a live room repeatedly, this processing method may simplify the search operations of a live room by the user, improve the search efficiency of a live room by the user, and further improve the viewing experience of a live room by the user.

It may be understood by those skilled in the art that, in the above-described method of specific embodiments, the draft sequence of each step does not mean a strict performing sequence or constitute any definition on the implementation process, and the specific performing sequence of each step should be determined according to its function and possible internal logic.

Based on the same inventive concept, the embodiments of the present disclosure also provide a demonstration device of a live room corresponding to a demonstration method of a live room; since the principles of solving the problem by the device in the embodiments of the present disclosure is similar to the above-described demonstration method of a live room in the embodiments of the present disclosure, the implementation of the device may refer to the implementation of the method, which will not be described in detail for repeated content.

Figure 5:
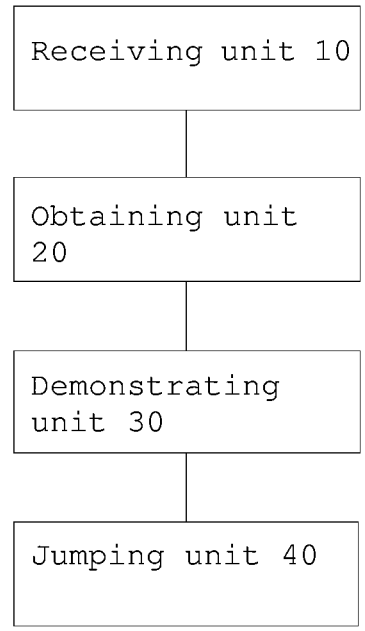
FIG. 5 shows a schematic view of a demonstration device of a live room provided by an embodiment of the present disclosure.

Referring to FIG. 5, it is a schematic view of a demonstration device of a live room provided by an embodiment of the present disclosure, which comprises a receiving unit 10, an obtaining unit 20, a demonstrating unit 30 and a jumping unit 40; wherein, The receiving unit 10 is configured to receive a search word in a search box of an interface;

The obtaining unit 20 is configured to obtain the recommendation prompt information corresponding to a target live room and the critical object information of at least one target object demonstrated in the target live room; wherein at least one attribute feature of the target live room is matched with the search word;

The demonstrating unit 30 is configured to demonstrate the recommendation prompt information and the critical object information in an area of the interface except for the search box;

The jumping unit 40 is configured to jump to a target page corresponding to the target information in the target live room in response to a trigger operation of the target information; wherein the target information comprises: the recommendation prompt information or the critical object information.

By way of the above-described processing method, the critical object information of the target demonstration object in the live room may be demonstrated for the user when the user searches for a corresponding live room, so that the user may determine a target object demonstrated in the live room before entering the live room. Compared with an existing method in which it is necessary to search for a live room and enter a live room repeatedly, this processing method may simplify the search operations of a live room by the user, improve the search efficiency of a live room by the user, and further improve the viewing experience of a live room by the user.

In one possible embodiment, the device is further configured to: determine a live room feature of the target live room; wherein the live room feature is associated with a type of the target live room; determine an object screening parameter matched with the live room feature from at least one screening dimension; wherein the screening dimension comprises at least one of the following: a live room dimension, an interactive data dimension of a demonstration object in the live room, or an object attribute dimension of a demonstration object in the live room; and determine a demonstration object matched with the object screening parameter as a target object among a plurality of demonstration objects in the target live room.

In one possible embodiment, the device is further configured to: determine a trigger probability of each of the demonstration objects in the target live room, wherein the trigger probability is determined based on the object association between a historical trigger object and each demonstration object, and the historical trigger object is a demonstration object of the trigger operation performed by the user in the live room at a historical moment; and determine the demonstration object that satisfies a trigger requirement as a target object among the demonstration objects based on the trigger probability.

In one possible implementation, the device is further configured to: determine at least one associative demonstration object of the target object among a plurality of demonstration objects in the target live room, wherein each of the associative demonstration objects and the target object contain an associated object attribute; and determine the critical object information based on the keyword of each of the target objects and the keyword of the associated demonstration object.

In one possible embodiment, the device is further configured to: demonstrate a plurality of first keywords in an area of the interface except for the search box; wherein the plurality of first keywords comprise a keyword of each of the target objects and a keyword of each of the associated demonstration objects; or splice the keyword of each of the target objects and the keyword of each of the associated demonstration objects to obtain a second keyword, and demonstrate the second keyword in an area of the interface except for the search box.

In one possible embodiment, the jumping unit is further configured to: obtain the object information of the target object and the object information of the associated demonstration object in response to a trigger operation of the first keyword or the second keyword, wherein the object information comprises: link information and a live-streaming segment, wherein the link information is a link for jumping to a corresponding object detail page; and jump to a demonstration object information page, and demonstrate the object information of the target object and the object information of the associated demonstration object in the object information page.

In one possible embodiment, the device is further configured to: obtain the live room attribute information of the candidate live room; wherein the live room attribute information comprises at least one of the following: a live room name, the identification information of the live room, the attribute information of an anchor corresponding to the live room, an object type of a demonstration object in the live room, or a live-streaming state of the live room; determine a candidate live room with the live room attribute information matched with the search word, and determine the target live room based on the matched candidate live room.

In one possible embodiment, the demonstrating unit is further configured to: demonstrate the recommendation prompt information in the first area of the interface; wherein the recommendation prompt information comprises at least one of the following: a recommendation prompt word associated with the search word, an image identification of the target live room or the viewer information of the target live room, wherein the first area is a lower area of the search box; demonstrate the critical object information in the second area of the interface; wherein the second area is an area adjacent to the first area in the lower area of the search box, and the critical object information is used to indicate the difference information of the target object relative to other demonstration objects in the target live room, and/or a current demonstration state of the target object.

In one possible embodiment, the device is further configured to: determine the target name information matched with the search word in the preset name information; wherein the name information comprises at least one of the following: a live room name of the target live room, an anchor name of an anchor corresponding to the target live room, or an object name of a demonstration object; and splice the target name information and the preset live-streaming information to obtain the recommendation prompt word.

In one possible implementation, the critical object information comprises at least one of the following: a narration state of the target object, an object type of the target object, the brand information to which the target object belongs, or an object name of the target object.

For the description of the processing flow of each unit in the device and the interaction flow between each unit, reference may be made to the relevant description in the above-described method embodiment, which will not be described in detail here.

Figure 6:
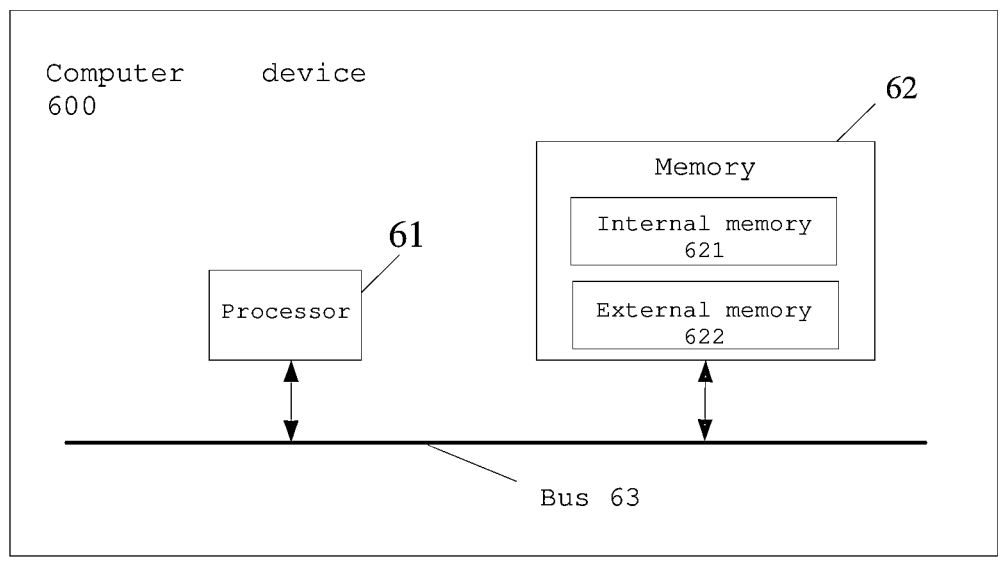
FIG. 6 shows a schematic view of a computer device provided by an embodiment of the present disclosure.

Corresponding to the demonstration method of a live room in FIG. 1, the embodiments of the present disclosure also provide a computer device 600, as shown in FIG. 6, which is a structural schematic view of the computer device 600 provided for the embodiments of the present disclosure, comprising:

a processor 61, a memory 62, and a bus 63; wherein the memory 62 is configured to store execution instructions, and comprises an internal memory 621 and an external memory 622; here, the internal memory 621, also referred to as an internal storage, is configured to temporarily store operation data in the processor 61 and data exchanged with the external memory 622 such as a hard disk; the processor 61 exchanges data with the external memory 622 through the internal memory 621, and during operation of the computer device 600, the processor 61 communicates with the memory 62 through the bus 63, so that the processor 61 executes the following instructions:

A search word in a search box of the interface is received;

The recommendation prompt information corresponding to a target live room and the critical object information of at least one target object demonstrated in the target live room are obtained; wherein at least one attribute feature of the target live room is matched with the search word;

The recommendation prompt information and the critical object information are demonstrated in an area of the interface except for the search box;

In response to a trigger operation of the target information, jump to a target page corresponding to the target information in the target live room; wherein the target information comprises: the recommendation prompt information or the critical object information.

The embodiments of the present disclosure also provide a computer-readable storage medium having a computer program stored thereon that, when executed by a processor, performs the steps of the demonstration method of a live room according to the above-described method embodiment. Wherein, the storage medium may be a volatile or nonvolatile computer-readable storage medium.

The embodiments of the present disclosure also provide a computer program product which carries a program code, wherein the program code comprises instructions that may be used to perform the steps of the demonstration method of a live room according to the above-described method embodiment; specifically, reference may be made to the above-described method embodiment, which will not be described in detail here.

Wherein, the above-described computer program product may be realized by hardware, software or a combination thereof. In one alternative embodiment, the computer program product is embodied as a computer storage medium, and in another alternative embodiment, the computer program product is embodied as a software product, such as a Software Development Kit (SDK) and the like.

It may be clearly understood by those skilled in the art that for convenient and concise description, for the specific operation process of the system and device described above, reference may be made to the corresponding process in the aforementioned method embodiment, which will not be described in detail here. In several embodiments provided by this disclosure, it should be understood that the disclosed systems, devices and methods may be realized in other methods. The device embodiments described above are only schematic; for example, the division of units is only a logical function division, and there may be another division method in actual implementation; for example, a plurality of units or components may be combined or integrated into another system, or some features may be neglected or not performed. On the other hand, the mutual coupling or direct coupling or communication connection shown or discussed may be indirect coupling or communication connection through some communication interfaces, devices or units, which may be electrical, mechanical or in other forms.

The units described as separate components may or may not be physically separated, and the components displayed as units may or may not be physical units, that is, they may be located in one place or distributed to a plurality of network units. Some or all of the units may be selected according to actual needs to achieve the purpose of the solution of this embodiment.

In addition, each functional unit in each embodiment of the present disclosure may be integrated into one processing unit, or each unit may exist physically alone, or two or more units may be integrated into one unit.

The functions, if implemented in the form of software functional units and sold or used as independent products, may be stored in a nonvolatile computer-readable storage medium that may be executed by a processor. Based on this understanding, the technical solution of the present disclosure in essence or a part contributing to the prior art or a part of this technical solution may be embodied in the form of a software product stored in a storage medium and comprising several instructions to cause a computer device (which may be a personal computer, a server, a network device, or the like) to perform all or some of the steps of the method according to various embodiments of the present disclosure. The aforementioned storage medium comprises: various media that may store program codes such as a USB flash disk, a mobile hard disk, a Read-Only Memory (ROM), a Random Access Memory (RAM), a magnetic disk or an optical disk.

Finally, it is to be noted that: the above-described embodiments are only specific embodiments of the present disclosure, which are intended to explain the technical solution of the present disclosure, rather than restricting the same, and the protection scope of the present disclosure is not limited thereto; although this disclosure has been described in detail with reference to the aforementioned embodiments, it should be understood by those of ordinary skill in the relevant art that: those skilled in the art whoever are familiar with the technical field may still modify or easily conceive of changes to the technical solution recited in the aforementioned embodiments within the technical scope of the present disclosure, or make equivalent substitutions for some of the technical features therein; however, these modifications, changes or substitutions do not make the essence of the corresponding technical solution depart from the spirit and scope of the technical solution of the embodiment of this disclosure, and should be comprised in the protection scope of this disclosure. Therefore, the protection scope of this disclosure should be determined according to the protection scope of the claims.

What is claimed is:

1. A demonstration method of a live room, comprising:
   receiving a search word in a search box of an interface;
   obtaining recommendation prompt information corresponding to a target live room and critical object information of at least one target object demonstrated in the target live room;
   wherein at least one attribute feature of the target live room is matched with the search word;
   demonstrating the recommendation prompt information and the critical object information in an area of the interface except for the search box;
   jumping to a target page corresponding to target information in the target live room in response to a trigger operation of the target information; wherein the target information comprises: the recommendation prompt information or the critical object information;
   determining a trigger probability of each of a plurality of demonstration objects in the target live room, wherein the trigger probability is determined based on an object association between a historical trigger object and each of the plurality of demonstration object, and the historical trigger object is a demonstration object of the trigger operation performed by a user in the live room at a historical moment; and
   determining the demonstration object that satisfies a trigger requirement as the target object among the plurality of demonstration objects based on the trigger probability.

2. The method according to claim 1, wherein the method further comprises:
   determining a live room feature of the target live room; wherein the live room feature is associated with a type of the target live room;
   determining an object screening parameter matched with the live room feature from at least one screening dimension; wherein the screening dimension comprises at least one of the following: a live room dimension, an interactive data dimension of a demonstration object in the live room, or an object attribute dimension of a demonstration object in the live room; and
   determining a demonstration object matched with the object screening parameter as the target object among a plurality of demonstration objects in the target live room.

3. The method according to claim 1, wherein the method further comprises:
   determining at least one associated demonstration object of the target object among the plurality of demonstration objects in the target live room, wherein each of the at least one associated demonstration objects and the target object contains an associated object attribute; and
   determining the critical object information based on a keyword of the target object and a keyword of the at least one associated demonstration object.

4. The method according to claim 3, wherein the demonstrating the critical object information in an area of the interface except for the search box comprises:
   demonstrating a plurality of first keywords in an area of the interface except for the search box, wherein the plurality of first keywords comprise a keyword of the target object and a keyword of each of the at least one associated demonstration objects;
   or
   splicing a keyword of the target object and a keyword of each of the at least one associated demonstration objects to obtain a second keyword, and demonstrating the second keyword in an area of the interface except for the search box.

5. The method according to claim 4, wherein the jumping to a target page corresponding to target information in the target live room in response to a trigger operation of the target information comprises:
   obtaining object information of the target object and object information of the associated demonstration object in response to a trigger operation of the first keyword or the second keyword, wherein the object information comprises: link information and a live-streaming segment, wherein the link information is a link for jumping to a corresponding object detail page; and
   jumping to a demonstration object information page, and demonstrating the object information of the target object and the object information of the associated demonstration object in the object information page.

6. The method according to claim 1, wherein the method further comprises:
   obtaining live room attribute information of a candidate live room; wherein the live room attribute information comprises at least one of the following: a live room name, identification information of the live room, attribute information of an anchor corresponding to the live room, an object type of a demonstration object in the live room, or a live-streaming state of the live room; and determining a candidate live room with the live room attribute information matched with the search word, and determining the target live room based on a matched candidate live room.

7. The method according to claim 1, wherein the demonstrating the recommendation prompt information and the critical object information in an area of the interface except for the search box comprises:

demonstrating the recommendation prompt information in a first area of the interface;

wherein the recommendation prompt information comprises at least one of the following: a recommendation prompt word associated with the search word, an image identification of the target live room or viewer information of the target live room, wherein the first area is a lower area of the search box; and demonstrating the critical object information in a second area of the interface; wherein the second area is an area adjacent to the first area in a lower area of the search box, and the critical object information is used to indicate at least one of difference information of the target object relative to other demonstration objects in the target live room, or a current demonstration state of the target object.

8. The method according to claim 7, wherein the method further comprises:

determining target name information matched with that search word in preset name information; wherein each of the target name information and preset name information comprises at least one of the following: a live room name of the target live room, an anchor name of an anchor corresponding to the target live room, or an object name of a demonstration object; and splicing the target name information and preset live-streaming information to obtain the recommendation prompt word.

9. The method according to claim 1, wherein the critical object information comprises at least one of the following: a narration state of the target object, an object type of the target object, brand information to which the target object belongs, or an object name of the target object.

10. A computer device, comprising: a processor, a memory and a bus, wherein the memory has processor-executable, machine-readable instructions stored thereon, the processor and the memory are communicated via the bus during operation of the computer device, and the machine-readable instructions, when executed by the processor, perform steps of a demonstration method of a live room comprising:

receiving a search word in a search box of an interface;

obtaining recommendation prompt information corresponding to a target live room and critical object information of at least one target object demonstrated in the target live room;

wherein at least one attribute feature of the target live room is matched with the search word;

demonstrating the recommendation prompt information and the critical object information in an area of the interface except for the search box;

jumping to a target page corresponding to target information in the target live room in response to a trigger operation of the target information; wherein the target information comprises: the recommendation prompt information or the critical object information;

determining a trigger probability of each of a plurality of demonstration objects in the target live room, wherein the trigger probability is determined based on an object association between a historical trigger object and each of the plurality of demonstration object, and the historical trigger object is a demonstration object of the trigger operation performed by a user in the live room at a historical moment; and determining the demonstration object that satisfies a trigger requirement as the target object among the plurality of demonstration objects based on the trigger probability.

11. The computer device according to claim 10, wherein the method further comprises:

determining a live room feature of the target live room; wherein the live room feature is associated with a type of the target live room;

determining an object screening parameter matched with the live room feature from at least one screening dimension; wherein the screening dimension comprises at least one of the following: a live room dimension, an interactive data dimension of a demonstration object in the live room, or an object attribute dimension of a demonstration object in the live room; and determining a demonstration object matched with the object screening parameter as the target object among a plurality of demonstration objects in the target live room.

12. The computer device according to claim 10, wherein the method further comprises:

determining at least one associated demonstration object of the target object among the plurality of demonstration objects in the target live room, wherein each of the at least one associated demonstration objects and the target object contains an associated object attribute; and determining the critical object information based on a keyword of the target object and a keyword of the at least one associated demonstration object.

13. The computer device according to claim 12, wherein the demonstrating the critical object information in an area of the interface except for the search box comprises:

demonstrating a plurality of first keywords in an area of the interface except for the search box, wherein the plurality of first keywords comprise a keyword of the target object and a keyword of each of the at least one associated demonstration objects;

or splicing a keyword of the target object and a keyword of each of the at least one associated demonstration objects to obtain a second keyword, and demonstrating the second keyword in an area of the interface except for the search box.

14. A non-transitory computer-readable storage medium having a computer program stored thereon that, when executed by a processor, performs steps of a demonstration method of a live room comprising:

receiving a search word in a search box of an interface;

obtaining recommendation prompt information corresponding to a target live room and critical object information of at least one target object demonstrated in the target live room;

wherein at least one attribute feature of the target live room is matched with the search word;

demonstrating the recommendation prompt information and the critical object information in an area of the interface except for the search box;

jumping to a target page corresponding to target information in the target live room in response to a trigger operation of the target information; wherein the target information comprises: the recommendation prompt information or the critical object information;

determining a trigger probability of each of a plurality of demonstration objects in the target live room, wherein the trigger probability is determined based on an object association between a historical trigger object and each of the plurality of demonstration object, and the historical trigger object is a demonstration object of the trigger operation performed by a user in the live room at a historical moment; and determining the demonstration object that satisfies a trigger requirement as the target object among the plurality of demonstration objects based on the trigger probability.

15. The non-transitory computer-readable storage medium according to claim 14, wherein the method further comprises:

determining a live room feature of the target live room; wherein the live room feature is associated with a type of the target live room;

determining an object screening parameter matched with the live room feature from at least one screening dimension; wherein the screening dimension comprises at least one of the following: a live room dimension, an interactive data dimension of a demonstration object in the live room, or an object attribute dimension of a demonstration object in the live room; and determining a demonstration object matched with the object screening parameter as the target object among a plurality of demonstration objects in the target live room.

16. The non-transitory computer-readable storage medium according to claim 14, wherein the method further comprises:

determining at least one associated demonstration object of the target object among the plurality of demonstration objects in the target live room, wherein each of the at least one associated demonstration objects and the target object contains an associated object attribute; and determining the critical object information based on a keyword of the target object and a keyword of the at least one associated demonstration object.

17. The non-transitory computer-readable storage medium according to claim 16, wherein the demonstrating the critical object information in an area of the interface except for the search box comprises:

demonstrating a plurality of first keywords in an area of the interface except for the search box, wherein the plurality of first keywords comprise a keyword of the target object and a keyword of each of the at least one associated demonstration objects;

or splicing a keyword of the target object and a keyword of each of the at least one associated demonstration objects to obtain a second keyword, and demonstrating the second keyword in an area of the interface except for the search box.

* * * * *